No. 875,686.
PATENTED JAN. 7, 1908.
C. BILLINGTON.
NOSE GUARD FOR EYEGLASSES.
APPLICATION FILED FEB. 2, 1907.
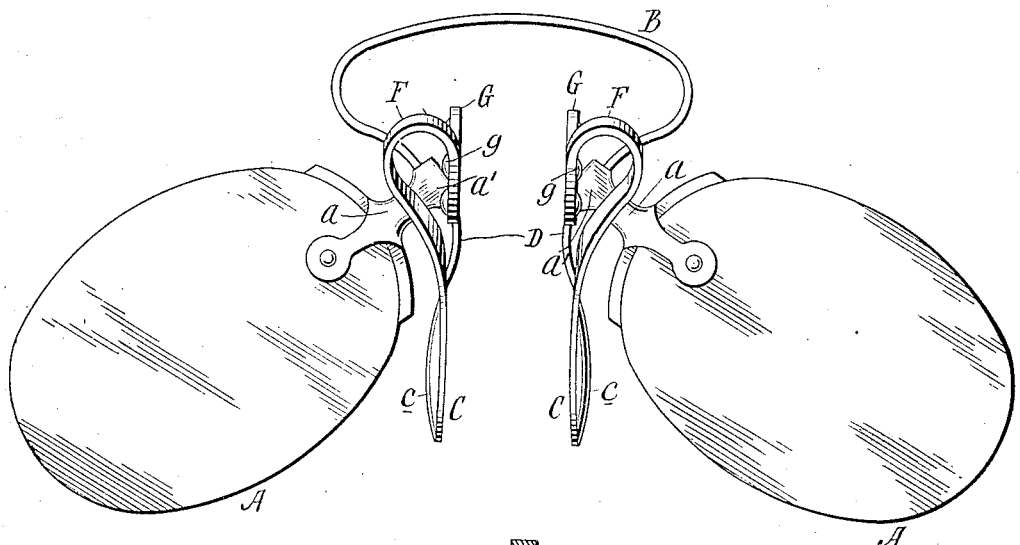
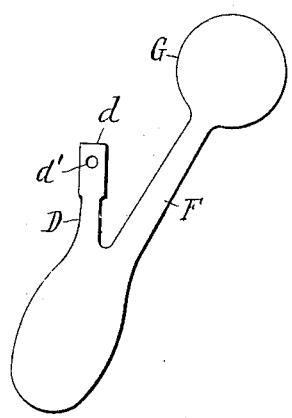
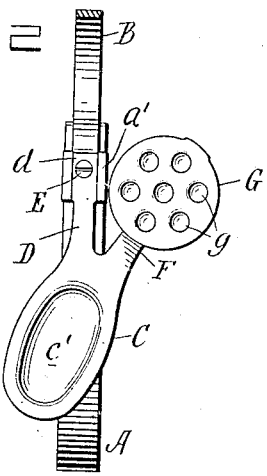
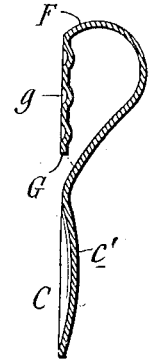
Witnesses
Inventor
Charles Billington,
By Edwin Guthrie
Attorney

UNITED STATES PATENT OFFICE.

CHARLES BILLINGTON, OF ATTLEBORO, MASSACHUSETTS.

NOSE-GUARD FOR EYEGLASSES.

No. 875,686.     Specification of Letters Patent.     Patented Jan. 7, 1908.

Application filed February 2, 1907. Serial No. 355,372.

*To all whom it may concern:*

Be it known that I, CHARLES BILLINGTON, a citizen of the United States, residing at Attleboro, in the county of Bristol and State of Massachusetts, have invented certain new and useful Improvements in Nose-Guards for Eyeglasses, of which the following is a specification.

My invention relates to nose guards for eyeglasses, and its object is to produce a one-piece guard that may be cheaply manufactured, that will be secure and comfortable upon the nose of the wearer and which will be universally adjustable. As an explanation of the expression "universally adjustable" in this connection, I have to state that my invention is ordinarily formed of metal which may be bent, and the two bearing surfaces with which each member of my invention is provided may be located, by suitably bending the metal, in practically any position desired to accommodate the peculiar formation of the wearer's face and to insure his comfort in wearing his eyeglasses, as well as the proper adjustment of the same.

I accomplish the stated object by fashioning the members of an eyeglass guard as illustrated in the accompanying drawings, of which Figure 1 represents a front view of a pair of eyeglasses with my invention applied. Fig. 2 is a view with one of the lenses omitted and a portion of the bow spring cut away, the observer looking towards the edge of the remaining lens. This view shows the ordinary inclined position of the member of the guard with respect to the plane of the lens. Fig. 3 is a plan view of the members of my invention before bending them into their final form. Fig. 4 is a vertical section of one of the members detached, to exhibit the customary depressions in the main bearing surface or rest and the pad.

Like letters are employed to refer to the same parts throughout the specification and drawings.

The letter A designates the lenses of a pair of eyeglasses having the customary post $a$ with the box or spring socket $a'$ at the end of the post adapted to receive the end of the bow spring B. Those elements are of the usual construction and constitute no part of my invention.

The twin members of the nose guard made in accordance with my invention comprise, see Fig. 3, a main bearing portion or rest C, having usually the depressed portion $c$, as best shown in Fig. 4. There is also an arm D projecting in an inclined direction at one side of the rest and having a rectangular head or end $d$ pierced by the hole $d'$. The head $d$ of the arm fits the socket $a'$ in the end of the post $a$, and the screw E secures both the head $d$ and the end of the spring in the socket. At the top, that portion of my invention which I have termed the rest C narrows into a relatively long neck F that terminates in an enlargement that may be called the pad G, and which is usually provided with one or more depressions $g$, as shown in Figs. 2 and 4.

Those various portions mentioned as the rest, the arm and head, the neck and pad, will be seen to belong to a single piece of sheet metal having, when first stamped out, the form set forth in Fig. 3. The metal employed by me may be, for example, sheet brass, heavily nickeled. This material may be bent and yet retain a certain amount of elasticity. Thus, the neck F may be curved into the gooseneck shape shown in Figs. 2 and 4, and the neck will afford almost any desired spring effect for the pad G, which is thus yieldingly held. The arm D is likewise susceptible of being bent, and its position thereby modifies with respect to rest C, and it is believed to be apparent that the relative positions of the pad and the arm may be changed. In fact, the rest and the pad are "universally adjustable" with relation to the fixed head of the arm D, that is to say, with the frame and lenses of the eyeglasses, and practically any fit of the nose guards or adjustment of the eyeglasses to suit a particular wearer may be made.

Having now described my invention, and explained the mode of its operation, what I claim is—

1. A nose guard comprising a single piece of sheet metal having one end formed into an elliptical main bearing having a depressed surface and the other end formed into a circular pad having a plurality of depressions, the said main bearing and pad being connected by a neck bent into a gooseneck form whereby the bearing surfaces of the main bearing and pad may be arranged to lie in the same plane, as set forth.

2. A nose guard comprising a single piece of sheet metal having one end formed into an elliptical main bearing and the other end formed into a circular pad, the bearing surface of the said pad and main bearing being depressed and one of the said surfaces having a number of depressions, the said main bearing and pad being connected by a neck bent into a gooseneck form whereby the bearing surfaces of the main bearing and pad may be arranged to lie in the same plane, as set forth.

In testimony whereof I affix my signature in presence of two witnesses.

CHARLES BILLINGTON.

Witnesses:
 JAMES BILLINGTON,
 RALPH C. ESTES.